(12) United States Patent
Ravishankar et al.

(10) Patent No.: US 10,541,745 B2
(45) Date of Patent: Jan. 21, 2020

(54) SYSTEM AND METHOD FOR NETWORK CONTROLLED GEOFENCING

(71) Applicant: HUGHES NETWORK SYSTEMS, LLC, Germantown, MD (US)

(72) Inventors: Channasandra Ravishankar, Germantown, MD (US); Nassir Benammar, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/919,125

(22) Filed: Mar. 12, 2018

(65) Prior Publication Data

US 2018/0262266 A1    Sep. 13, 2018

Related U.S. Application Data

(60) Provisional application No. 62/470,101, filed on Mar. 10, 2017.

(51) Int. Cl.
| | | |
|---|---|---|
| *H04W 36/00* | (2009.01) | |
| *H04B 7/185* | (2006.01) | |
| *H04W 64/00* | (2009.01) | |
| *H04W 16/14* | (2009.01) | |

(52) U.S. Cl.
CPC ..... *H04B 7/18558* (2013.01); *H04B 7/18528* (2013.01); *H04B 7/18541* (2013.01); *H04W 16/14* (2013.01); *H04W 64/00* (2013.01)

(58) Field of Classification Search
CPC .. H04W 16/14; H04W 64/00; H04B 7/18558; H04B 7/18541; H04B 7/18528

USPC ......................................................... 455/440
See application file for complete search history.

(56) References Cited

U.S. PATENT DOCUMENTS

| | | | | |
|---|---|---|---|---|
| 6,198,909 | B1* | 3/2001 | Du .................. | H04W 16/10 455/67.11 |
| 6,389,289 | B1* | 5/2002 | Voce ................ | H04B 7/18547 455/429 |
| 8,380,170 | B2* | 2/2013 | Wilson ................ | H04K 3/65 455/411 |
| 2002/0142781 | A1* | 10/2002 | Wiedeman ......... | H04B 7/18547 455/456.5 |
| 2008/0026767 | A1* | 1/2008 | Krstulich .............. | H04L 63/104 455/452.2 |
| 2008/0287124 | A1* | 11/2008 | Karabinis .......... | H04B 7/18536 455/427 |
| 2015/0036509 | A1* | 2/2015 | Lopes ................... | H04W 16/10 370/241.1 |
| 2015/0341749 | A1* | 11/2015 | Jodlauk .............. | H04L 12/1845 455/414.2 |
| 2017/0142632 | A1* | 5/2017 | Panchal ................ | H04W 36/38 |

(Continued)

*Primary Examiner* — Khoi H Tran
*Assistant Examiner* — B M M Hannan
(74) *Attorney, Agent, or Firm* — Jones Robb, PLLC

(57) ABSTRACT

A system and method for networked geofencing includes identifying restricted areas in a service region, and defining a protective zone surrounding the restricted areas. A service availability map containing the protective zones is generated and broadcast within the service region. The positions of terminals on the service availability map are detected relative to the protective zones. Terminals inside the protective zones establish communication using a first frequency range, and terminals outside of the protective zones establish communication using either the first frequency range or a second frequency range.

19 Claims, 9 Drawing Sheets

(56) References Cited

U.S. PATENT DOCUMENTS

2017/0171792 A1\* 6/2017 Axmon ............ H04W 56/0035
2018/0253424 A1\* 9/2018 Banerjee ............. G06K 9/4642

\* cited by examiner

| Beam Radius (Km) | Granularity (Km) | # of Tiles | Comp. Ratio | Broadcast Time (Sec.) |
|---|---|---|---|---|
| 125 | 10 | 676 | 0.5 | 15.36 |
| 200 | 10 | 1849 | 0.5 | 46.08 |
| 300 | 10 | 4096 | 0.5 | 97.28 |
| 125 | 5 | 2009 | 0.5 | 66.56 |
| 200 | 5 | 7396 | 0.5 | 168.96 |
| 300 | 5 | 16641 | 0.5 | 378.88 |

Fig. 4

SYSTEM AND METHOD FOR NETWORK CONTROLLED GEOFENCING

CROSS-REFERENCE TO RELATED APPLICATION

The present application claims priority to U.S. Provisional Patent Application No. 62/470,101 filed Mar. 10, 2017, the entire disclosure of which is incorporated herein by reference.

BACKGROUND INFORMATION

Mobile communication systems provide voice and data access to users while allowing a high level of mobility. For example, terrestrial cellular systems are widely used by consumers, particularly in urban areas. Satellite systems provide user access from any location within a line of site to the satellite. As these mobile communication systems become more accessible, the number of consumers utilizing such systems has correspondingly increased. Both systems utilize specific frequency spectrums to facilitate communication. Frequency spectrum, however, is limited and very costly.

The increased consumer use of mobile communication systems and limited frequency spectrum has increased the need for integrating multiple communication systems, such as satellite and terrestrial cellular systems. One area of such integration is the combined use of cellular/mobile networks and L-band satellite networks. L-band satellite services (e.g., voice, packet data, etc.) typically cannot be provided in regions where cell towers are present unless strict guidelines are followed. For example, a satellite terminal (also referred to as user terminal or simply terminal) that is within a predetermined radius (e.g., 10 km) of a terrestrial base station should not transmit signals on specific radio bands, including random access channels (RACH) in order to avoid interference with transmissions from the cellular/mobile network. Additionally, there may be regulatory provisions that restrict transmission from a satellite terminal in certain regions from a particular spot-beam (or beam or coverage beam). Such restrictions can make it difficult to efficiently share the frequency spectrum.

Based on the foregoing, there is a need for an approach for controlling voice and internet protocol (IP) data services in various regions of satellite spot beams where satellite terminals are not allowed to transmit.

BRIEF SUMMARY

A system and method are disclosed for networked controlled geofencing. According to an embodiment, the system includes a plurality of terminals; and at least one gateway comprising a transceiver for transmitting and receiving information to and from the plurality of terminals. The at least one gateway is configured to: identify restricted areas within at least one service region of a first communication system, define a protective zone surrounding each restricted area, generate a service availability map having a plurality of tiles representative of the at least one service region, the service availability map including at least information corresponding to the protective zones, and broadcast the service availability map to terminals within the at least one service region. Each terminal is configured to: detect its position on the service availability map relative to the protective zones, establish communication using a first frequency range if the detected position is inside one of the protective zones, and establish communication using either the first frequency range or a second frequency range if the detected position is outside of the protective zones. The first frequency range belongs to the first communication system, and the second frequency range belongs to a second communication system and is shared with the first communication system.

According to another embodiment, the method includes: identifying restricted areas within at least one service region of a first communication system; defining a protective zone surrounding each restricted area; generating a service availability map having a plurality of tiles representative of the at least one service region, the service availability map including at least information corresponding to the protective zones; broadcasting the service availability map to terminals of the first communication system within the at least one service region; detecting a position of a selected terminal on the service availability map relative to the protective zones; establishing communication using a first frequency range if the selected terminal is inside one of the protective zones; and establishing communication using either the first frequency range or a second frequency range if the selected terminal is outside of the protective zones, wherein the first frequency range belongs to the first communication system, and wherein the second frequency range belongs to a second communication system and is shared with the first communication system.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 is a table illustrating the results of exemplary parameters used to create a service availability map, according to one embodiment;

DETAILED DESCRIPTION

A system and method system for applying geofencing techniques to control voice and data services in various regions of satellite spot beams that contain restricted regions are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
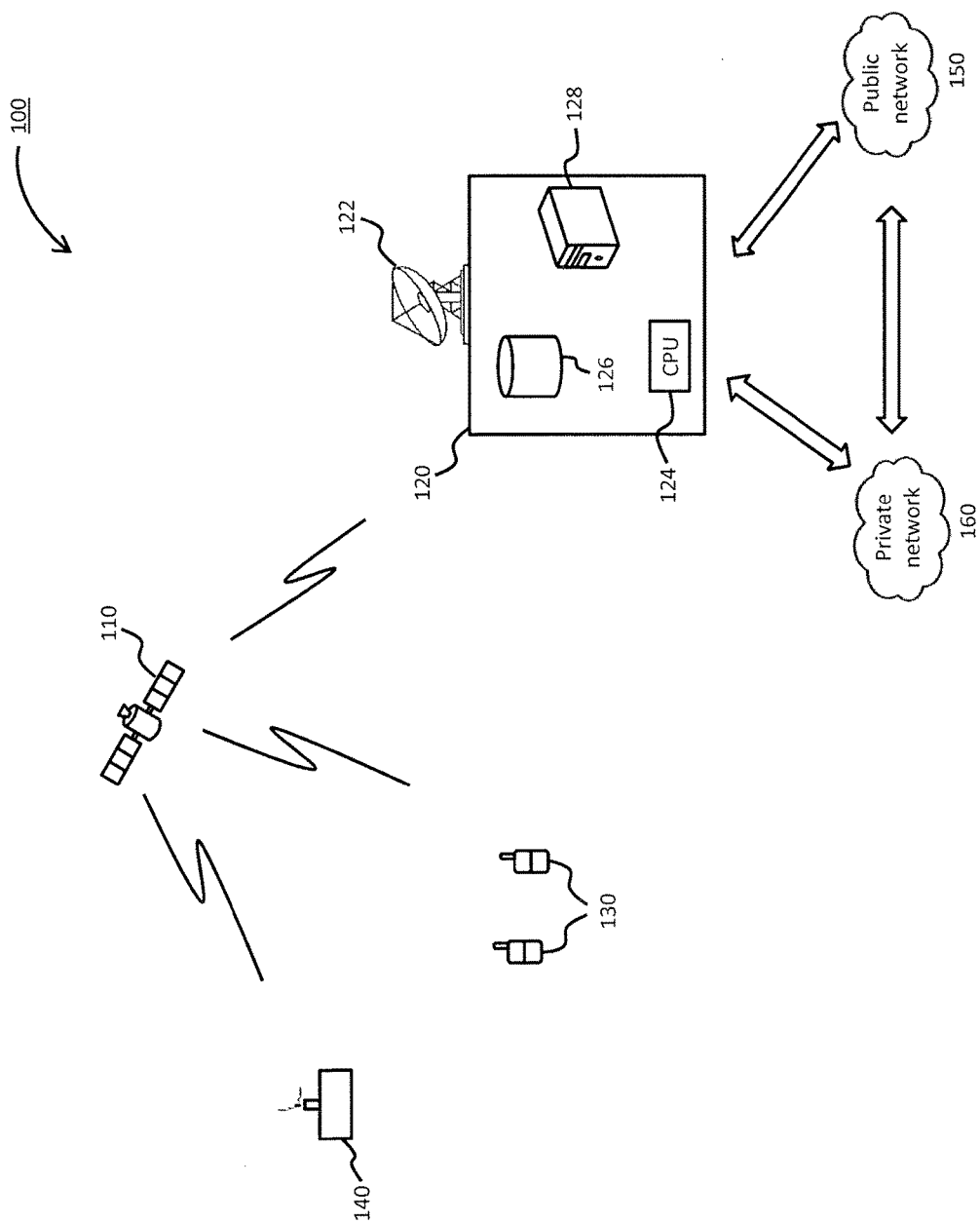
FIG. 1 is a diagram of a satellite communication system capable of providing voice and data services, together with geofencing functions, according to various embodiments.

FIG. 1 illustrates a satellite communication system 100 capable of providing voice and data services, together with geofencing functions. The communication system 100 includes a satellite 110 that supports communications among a number of gateways 120 (only one shown) and multiple user terminals (or terminals). According to the illustrated embodiment, the terminals can be in the form of mobile terminals 130 and fixed terminals 140. Each mobile terminal 130 can be configured to relay voice and data communication to/from a user. The mobile terminals 130 are also portable and can be transported by users while walking, driving, etc. Although not shown in FIG. 1, the mobile terminals 130 can also include global positioning system (GPS) receivers and associated circuitry which allows each terminal 130 to determine its precise geographical location. Each fixed terminal 140 can be configured for relaying traffic to/from various customer premise equipment (not shown). The customer premise equipment can include, for example, desktop computers, laptops, tablets, etc. According to at least one embodiment, the fixed terminal 140 can be in the form of very small aperture terminals (VSATs).

The gateway 120 can include various components to facilitate communication with the satellite 110. According to at least one embodiment, the gateway 120 can include a radio frequency (RF) transceiver 122, a processing unit 124 (or computer, CPU, etc.), and a data storage unit 126. The data storage unit 126 can be used to store and provide access to various information pertaining, in part, to operations in the satellite communication system 100. According to other embodiments, the gateway 120 can include multiple processing units 124 and multiple data storage units 126 in order to accommodate the needs of a particular system implementation. The gateway 120 can also include one or more workstations 128 (e.g., computers, laptops, etc.) in place of, or in addition to, the processing unit 124 (or multiple processing units). According to various implementations, the processing unit 124 and/or the one or more workstations 125 are capable of executing program instructions such that they become configured to perform various functions associated with operation of the gateway 120. The gateway 120 can be configured to route voice and/or traffic from the mobile terminals 130 and fixed terminals 140 across the public network 150 and private network 160 as appropriate. The gateway 120 can be further configured to route voice and/or data traffic from the public 150 Internet and private network 160 across the satellite link to the appropriate terminals 130, 140.

Figure 2:
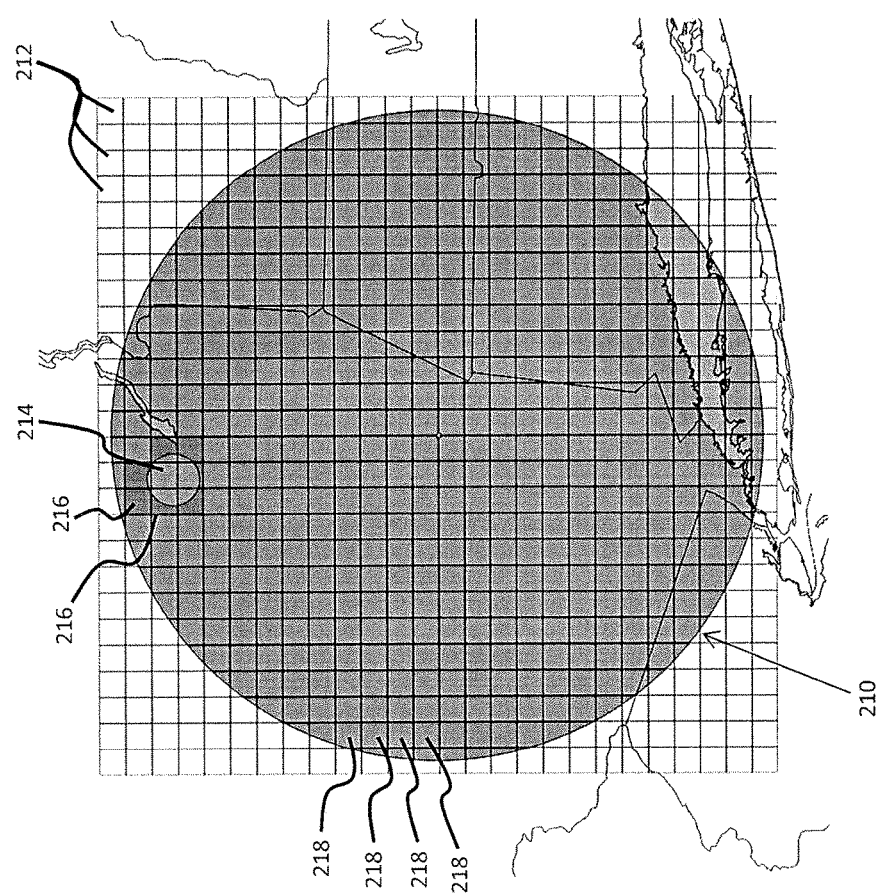
FIG. 2 is a diagram illustrating partition of a beam coverage area, according to one embodiment.

FIG. 2 is a diagram illustrating partition of a beam coverage area, according to one embodiment. A satellite beam 210 (or beam coverage area) can be configured to provide service to terminals within the enclosed area. According to various embodiments, the satellite communication system shares frequencies with a terrestrial wireless communication system (i.e., cellular/mobile network). Within a particular beam, satellite terminals (or terminals) can be configured to utilize a first frequency range (or frequency spectrum) belonging to the satellite communication system. The first frequency range is used exclusively by the satellite communication system. Terminals can be further configured to utilize a second frequency range belonging to the terrestrial wireless communication system (i.e., cellular/mobile network). According to various embodiments, however, the second frequency range can belong to government or private facilities for internal use within a predefined geographical space. The second frequency range can also belong to scientific organizations utilizing, for example, radio telescopes. The second frequency range is shared between satellite communication system and the terrestrial wireless communication system. As will be discussed in greater detail, various geofencing techniques are applied to reduce and/or eliminate interference that can be caused by the satellite terminals while utilizing the second frequency range.

According to at least one embodiment, a plurality of tiles 212 can be used to partition the beam coverage area 210. The tiles 212 can be sized in various configurations in order to properly represent features such as restricted areas. As illustrated in FIG. 2, a restricted area such as a cell tower 214 is located within the beam coverage area 210. Depending on specific regulations and/or restrictions a protective zone having a predetermined radius can be defined relative to the location of the cell tower 214. The predetermined radius can be selected based on various factors including, but not limited to, precise frequencies being shared, specific entity represented by the restricted area (e.g., government, cell tower, etc.), maximum transmit power of the terminal, acceptable interference levels with the shared frequency ranges, etc. The radius of the protective zone can be selected as 5 Km, 10 Km, 15 Km, etc. According to one or more embodiments, tiles 212 which fall within the protective zone can be designed as exclusion tiles 216. Service using the second (or shared) frequency range would typically be unavailable in areas represented by the exclusion tiles 216. Tiles which fall outside of the protective zone can be designated as shared frequency tiles 218. Service in areas represented by the shared frequency tiles 218 would be available using either the first frequency range or the second frequency range.

The gateway can be configured, for example, to utilize the tile information to generate a service availability map that includes information to identify the location of protective zones defined by the exclusion tiles 216. The service availability map can also include information pertaining to the restricted areas such as the cell tower 214. Under normal conditions, the status (e.g., service allowed/not allowed) of exclusion tiles 216 and shared frequency tiles 218 will be broadcast as part of the a service availability map for the selected beam coverage area 210. According to one or more embodiments, the gateway can be configured to compress the data corresponding to the service availability map prior to transmission. For example, compression algorithms such as ITU-T T.4 can be applied prior to broadcasting the service availability map in order to reduce bandwidth over the satellite network.

Prior to sending a random access channel (RACH) request, each terminal uses its current GPS position to determine whether it is currently located in a tile which allows service using the shared (or second) frequency range such as a shared frequency tile 218. Thus, the terminal is capable of complying with any predetermined requirements associated, for example, with the exclusion tiles 216. According to an embodiment, the status information broadcast over the satellite network can extend beyond the beam coverage area 210. Such a feature allows user terminals with mobile capabilities to receive the status information if they move beyond the boundary of the beam coverage area 210. Furthermore, such a feature allows user terminals that are outside the beam coverage area 210 to receive status information pertaining to its ability to transmit to the satellite prior to entering the beam coverage area.

Figure 3:
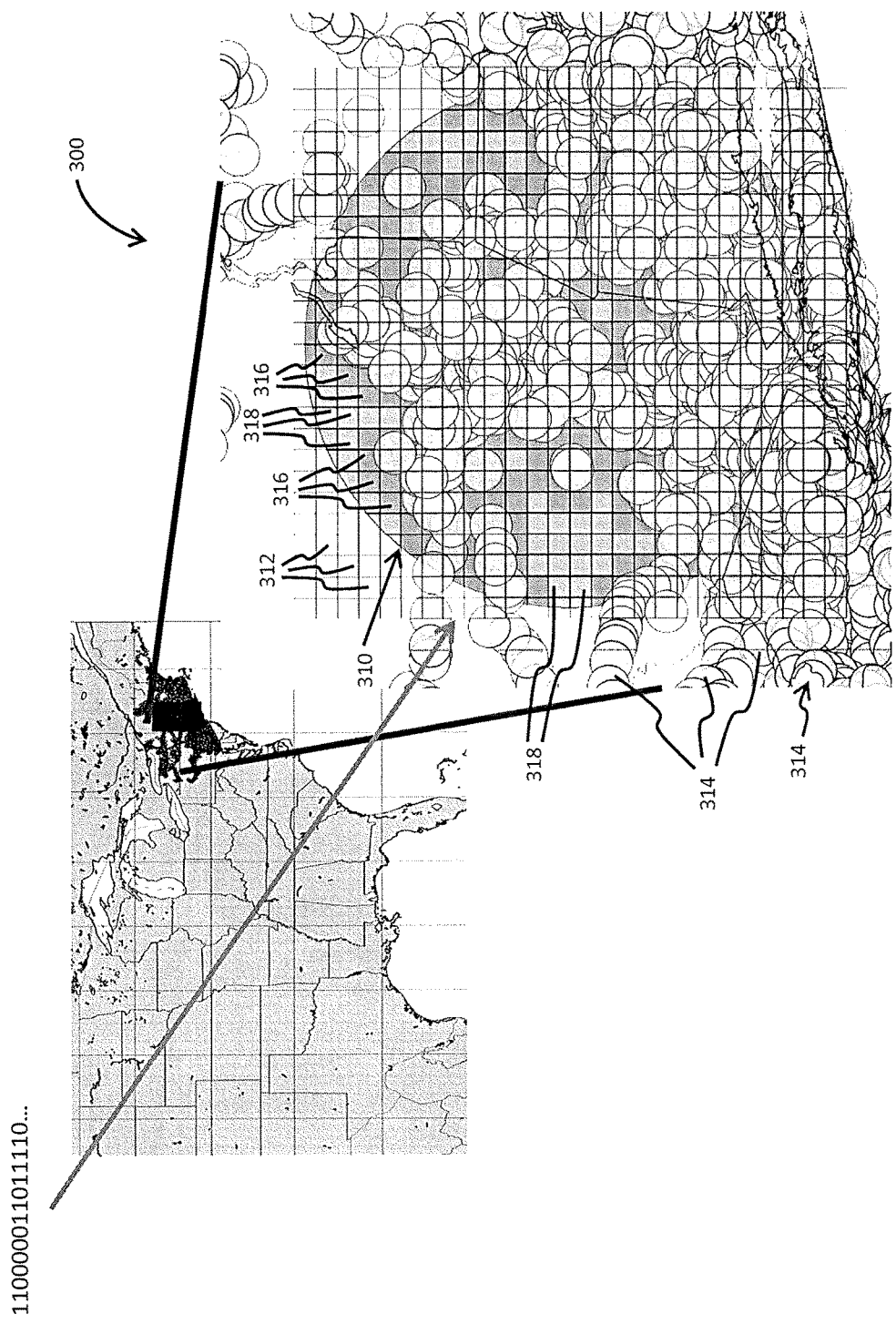
FIG. 3 is a diagram illustrating a service availability map, according to one embodiment.

FIG. 3 is a diagram illustrating a service availability map, according to one embodiment. The service availability map 300 provides a representation of the beam coverage area 310 (i.e., the satellite beam) using a plurality of tiles 312. According to an embodiment, the tiles 312 can be assigned values which are indicative of permitted activities at the geographical area occupied by the tile. As illustrated in FIG. 3, the service availability map 300 can include exclusion tiles 316 that are used to define locations in which the terminals are not allowed to establish communication using frequency ranges that are shared with the terrestrial wireless communication system (i.e., cellular/mobile network). The exclusion tiles 316 can correspond to protective zones which surround restricted areas such as cell towers 314. Depending on the specific implementation, however, the restricted areas can also correspond to any entity (e.g., government, private, scientific, etc.) which owns a frequency spectrum that is being shared with another communication system (e.g., satellite, wireless, etc.) outside of the protective zone. The service availability map 300 can also include shared frequency tiles 318 which identify locations where the terminals are allowed to establish communication using the shared frequency ranges. Thus, terminals currently located in areas represented by exclusion tiles 316 can only establish communication using non-shared frequency ranges (e.g., first frequency range) belonging to the satellite communication system, whereas terminals located in areas represented by shared frequency tiles 318 can establish communication using either the non-shared frequency ranges (e.g., first frequency range) or the shared frequency ranges (e.g., second frequency range).

While FIG. 3 illustrates frequency ranges being shared with a single entity (i.e., terrestrial wireless), it should be noted that other embodiments allow for shared frequency ranges with multiple entities. Within a particular beam coverage area, for example, a first shared frequency range can be established with the terrestrial wireless network, a second shared frequency range can be established with a government entity, and a third shared frequency range can be established with a scientific organization utilizing an array of radio telescopes. According to such embodiments, the service availability map can further include information which indicates the specific shared frequency range which cannot be used by the terminal in a particular protective zone. For example, the service availability map can specify that the first shared frequency cannot be used within a particular protective zone, while the second and third shared frequency ranges can be used. Additional embodiments also allow for shared frequency ranges between different terrestrial wireless networks, between a terrestrial wireless network and a government entity, between a terrestrial wireless network and a scientific organization, or any combination thereof.

According to at least one embodiment, prior to being broadcast to all terminals, the service availability map 300 can be converted in to a compressed bitmap corresponding to each tile within the beam coverage area 310. Furthermore, reference points (e.g., lat./long.) and tile size are broadcast to the terminals. The bitmap can be configured to indicate which areas (or tiles) have available service using pattern of 1s and 0s (e.g., 110000011011110 . . . ). Depending on the specific implementation, each beam coverage area 310 can be represented by the same number of tiles. According to other implementations, the number of tiles used to represent each beam coverage area 310 can differ based, at least in part, on the level of granularity required to reflect the number of terminals, bandwidth, etc. Furthermore, the number of tiles used to represent each beam coverage area 310 can be dynamically changed (i.e., in real-time) and updated for transmission to all terminals. An increased number of tiles (i.e., smaller tile size) can facilitate greater accuracy in defining the protective zone. The size of the service availability map 300 being broadcast, however, would increase relative to the increase in tiles. According to at least one embodiment, the tile size can be decreased within a portion of the beam coverage area 310 to represent densely populated regions, and increased within other portions of the beam coverage area 310 that are less densely populated.

According to at least one embodiment, each terminal can operate in two primary modes, namely an idle mode, and a connected mode. In the "idle mode", the terminal is not party to a communication session. Terminals can, therefore, download (or receive) the service availability map 300 and any additional system information required establish a communication session. The terminal uses its current GPS position to determine the tile representing its location in the beam coverage area 310. Each terminal also checks if service is available according to the bitmap that is currently being broadcast. If a terminal is located within an exclusion tile 316 where service is currently not allowed, the terminal would not be allowed to initiate a RACH request. If the terminal moves from an exclusion tile 316 where service is not allowed to a shared frequency tile 318 where service is allowed, a notification can be generated to indicate service availability.

In "connected mode", the terminal uses its GPS position to determine if it is currently located in a restricted tile 316 or a shared frequency tile 318 (e.g., non-restricted tile). The terminal immediately disconnects if it is using the shared frequency range and either moves to a restricted service area or moves to an area for which the status is currently unknown. According to various implementations, however, the terminal can initiate a frequency handoff with the gateway upon entering a tile (e.g., an exclusion tile) which prohibit use of the frequency range currently being used in order to avoid dropping the communication session.

According to various embodiments, the gateway can include an interface to a server that provides information regarding base station locations (lat./long.) for the terrestrial wireless network. According to further embodiments, such information can be stored locally in the gateway's data storage unit or workstation. The gateway can use existing knowledge of base station locations and a grid (or tile) layout in order to determine the grids/tiles in which user terminals are allowed to transmit. One bit representation can be used for each grid/tile indicating service availability (eligibility for the terminal to transmit). The gateway can subsequently generate a bit-stream for the grids/tiles corresponding to a beam coverage area, and apply ITU-T T.4 compression to the bit stream. The gateway can further transmit compressed bit-stream on system information (class 4). A reference grid point (top-left for example) and number of rows and columns can also be transmitted on the system information.

Additional embodiments allow terminals in idle mode to be configured to:

read Class-4 information to obtain compressed bit-stream;
uncompress (using ITU T.4 method) the bit-stream;

merge grid/tile status information with any other grid/tile status information that the terminal may have learned from other beams; and store new information if there is an update to the bit-map of the current beam coverage area.

In connected mode, the terminals can be configured to check their position against the grid/tile status information to confirm its eligibility to transmit prior to transmitting a RACH request. Once a connection has been established, the terminal continues to check eligibility to transmit based on stored information, if it is currently moving (or has recently moved). This can be accomplished, for example, by utilizing GPS reception capabilities while in the connected mode.

FIG. 4 is a table 400 illustrating the results of exemplary parameters used to create a service availability map that is broadcast to the terminals. According to various embodiments smaller tiles can be used to provide better granularity and less unwanted service blocking. In order to compensate for the increased data transmission associated with finer granularity, class 4 compression standards (or any other class that carries information that changes very slowly) can be used in the system information, since regulatory restrictions do not change too frequently. For example, the following exemplary parameters can be used for the table illustrated in FIG. 4:

Class 4 segment size 120 bits
Periodicity of transmission every 5.12 sec
Every 16 BCCH transmissions
BCCH transmission is every 320 ms As can be seen from the table 400, the number of tiles required to represent the service availability map will increase based on the beam radius and the level of granularity. The amount of time required to broadcast the service availability map, however, will increase based on the number of tiles that must be included.

Figure 5A:
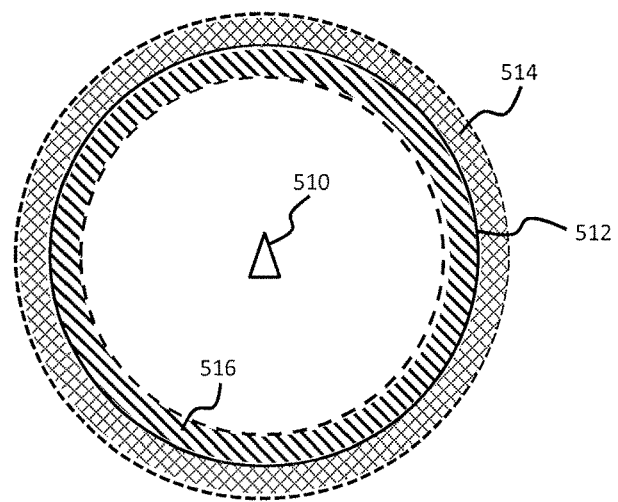
FIG. 5A is a diagram illustrating a configuration for a protective zone, according to one embodiment.

FIG. 5A is a diagram illustrating a configuration for a protective zone, in accordance with at least one embodiment. According to the illustrated embodiment, the restricted area can be in the form of a cell tower 510 for a terrestrial-based wireless communication system. According to various embodiments, however, the restricted area may correspond to a government installation which utilizes specific frequencies for internal communications. According to further embodiments, the restricted area can correspond to scientific installations utilizing, for example, radio telescopes.

According to the illustrated embodiment, a protective zone 512 is defined around the cell tower 510. It should be noted that the circular configuration of the protective zone 512 is only meant to be illustrative and for purposes of explaining various features. The actual shape and size of the protective zone 512 can vary depending on the specific restricted area. For example, a cell tower in a rural area may be associated with a circular, or oval type, of protective zone. In densely populated urban areas, however, multiple cell towers 510 are typically distributed within close proximity of each other. Depending on the predetermined radius established, the protective zone 512 may be configured to surround all of the cell towers 510, thereby resulting in a non-geometric enclosure. Additionally, restricted areas such as government installations can have varying shapes depending on the specific type of installation. The actual protective zone would be defined such that it encloses the entirety of the restricted area.

According to at least one embodiment, an entry transition area 514 can be defined to surround the protective area 512. The entry transition area 514 functions as a buffer between the protective zone 512 and external areas where the frequency spectrum of the terrestrial wireless communication system is shared with other communication systems (e.g., a satellite communication system). According to an embodiment, terminals that are mobile and traveling outside of the protective zone 512 can utilize the entry transition area 514 to request a frequency handoff, if such terminals are currently utilizing the shared frequency range. More particularly, a terminal would request allocation for bandwidth that is within the frequency range (or spectrum) owned by its primary (or home) communication system. If the terminal is currently idle while moving into the entry transition area 514, various implementations allow for the terminal to request bandwidth allocation using frequencies assigned to its primary communication system when establishing a new communication session. According to such embodiments, the terminal can be prevented from utilizing the shared frequencies to require bandwidth allocation while in the protective zone 512.

The embodiment illustrated in FIG. 5A further incorporates an exit transition area 516. The exit transition area 516 is surrounded by the protective zone 512 and immediately adjacent thereto. The exit transition area 516 also provides a buffer within which the terminal can request bandwidth re-allocation from a different frequency range. More particularly, a terminal that is exiting the protective zone 512 can utilize the exit transition area 516 to request handoff to either the non-shared frequency range used by its primary communication system or the shared frequency range. It should be noted, however, that a frequency handoff may not be necessary in situations where there is no need to utilize the shared frequency range, such as periods of light system load on the first frequency range and/or periods of heavy system load on the second (or shared) frequency range.

Figure 5B:
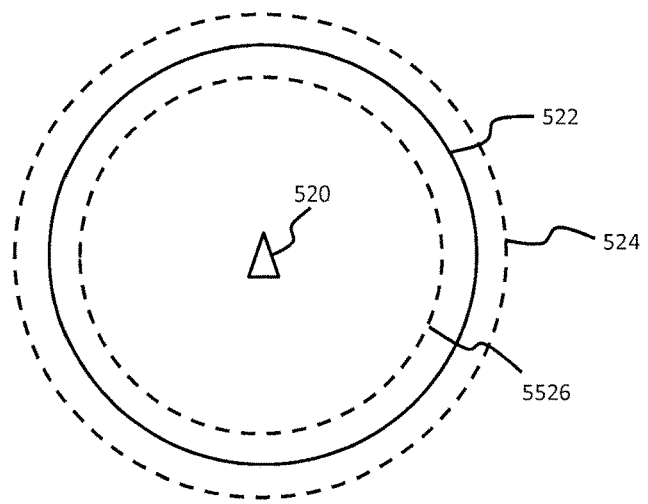
FIG. 5B is a diagram illustrating a configuration for a protective zone, according to another embodiment.

FIG. 5B is a diagram illustrating a configuration for a protective zone in accordance with one or more embodiments. A restricted area, such as a cell tower 520, is shown as being surrounded by a protective zone 522. Depending on the specific communication system that must be isolated from the restricted area 520, individual terminals may have different properties such as a maximum transmit power. For example, satellite communication systems can include various terminals which are capable of transmitting at different levels of power.

According to at least one embodiment, the communication system can assign transmit power ratings to each terminal. When the service availability map is broadcast from the gateway, a system message can be included to additionally specify a high power protective zone 524 and a low power protective zone 526. The high power protective zone 524 surrounds the protective zone 522 and thus defines a larger area within which the terminal cannot utilize the shared frequency range. the low power protective zone 526 defines an area that is smaller than protective zone 522. Terminals having higher than average transmit power would utilize the high-power protective zone 524 as the border for terminating the use of the shared frequency range. Terminals having lower than average transmit power would be allowed to continue using the shared frequency range beyond protective zone 522, until the low-power protective zone 526 is reached. Thus, such terminals could continue utilizing the shared frequency range without risk of interfering with the cell tower 520 or other restricted area.

While FIG. 5B illustrates two supplemental protective zones (524, 526), it should be noted that additional transmit power ratings can be assigned to the terminals, and such ratings would also correspond to different supplemental protective zones. For example, five different transmit power ratings can be defined for the terminals of the communication system. Two of the transmit power ratings can be lower than average, while two other transmit power ratings are higher than average. Under such an implementation, five total protective zones would be defined to correspond with each of the terminal transmit power ratings. Furthermore, the size increments between the protective zones do not need to be fixed relative to one another. For example, the two transmit power ratings that are higher than average can be assigned to protective zones that are 5% and 15% greater than the protective zone used for average transmit power ratings. The two transmit power ratings that are lower than average can be assigned to protective zones that are 7% and 10% smaller. The difference between protective zones can also be selected based on the relative difference in transmit power ratings between different groups and/or classes of terminals. Furthermore, transition areas can be provided for all protective zones.

According to at least one embodiment, rather than defining multiple supplemental protective zones, each terminal can be configured to determine an appropriate protective zone based on its designated output power rating. For example, a terminal designated as having a high output power rating can be configured to automatically increase the distance from protective zone 522 by a predetermined amount, e.g. 10%, in order to define the high power protective zone 524. Similarly, terminals having a low transmit power rating can be configured to automatically reduce the distance from protective zone 522 by a predetermined amount, e.g., 15%, in order to define the low power protective zone 526.

Figure 6:
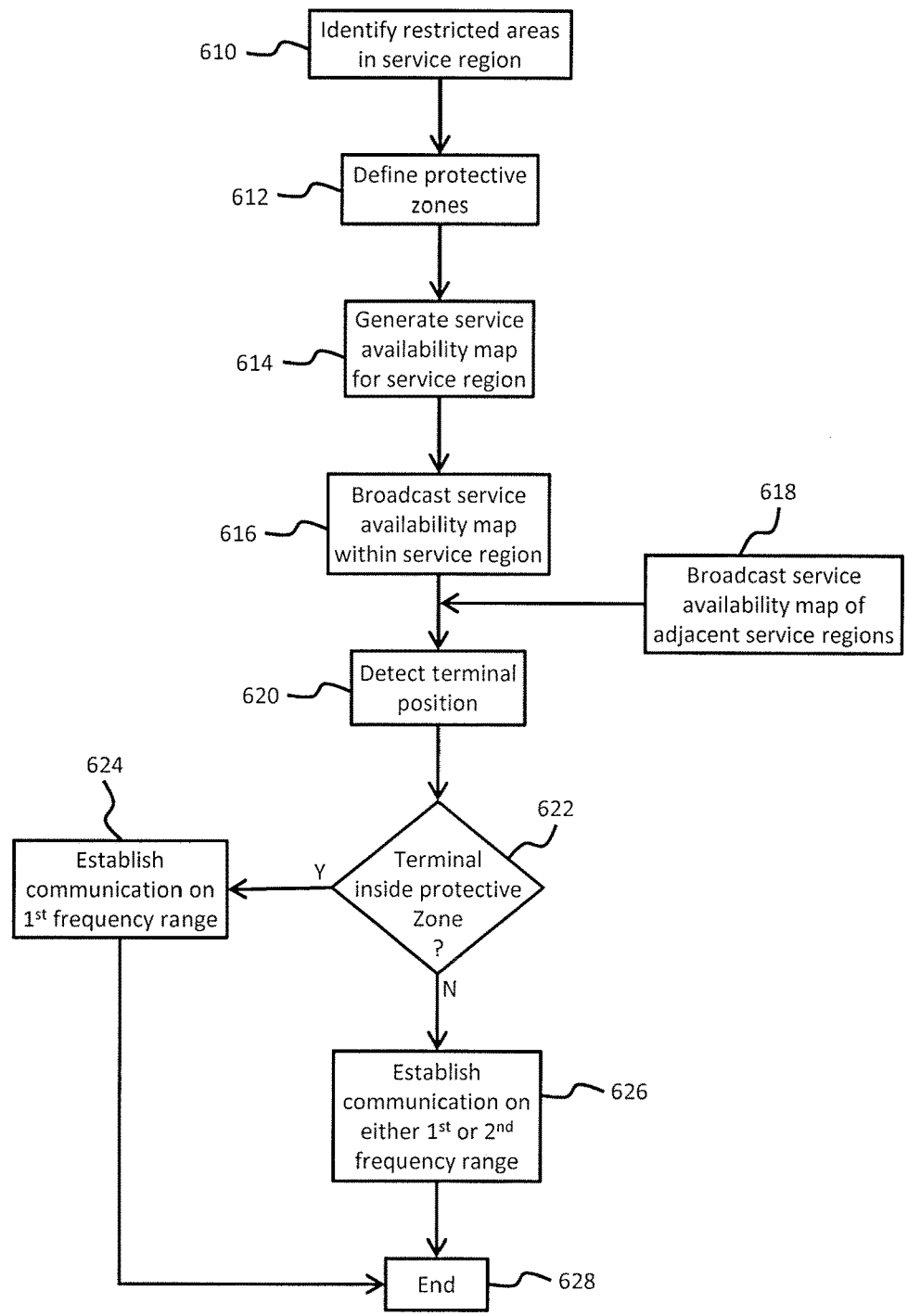
FIG. 6 is a flowchart illustrating steps performed to provide network controlled geofencing, according to various embodiments.

FIG. 6 is a flowchart illustrating steps performed to provide network controlled geofencing, according to one or more embodiments. At 610, restricted areas within the service region are identified. This can correspond, for example, to the gateway identifying the location of cell towers, government installations, scientific facilities, etc. within a beam of the satellite communication system. At 612, protective zones are defined to surround each of the restricted areas. For example, agreements may be reached to identify specific distances which must be maintained if the satellite communication system requires the use of the frequency range shared with the terrestrial wireless communication system. Thus, the gateway would identify specific geographical positions which define the protective zones. At 614, a service availability map is generated for the service region. According to various embodiments, the service availability map can utilize a plurality of tiles having specific geographical sizes in order to define the service region. The size of each tile can also vary depending, in part, on the number of restricted areas.

The tiles can represent specific physical locations corresponding to the restricted areas, specific geographical areas which define the protective zones, as well as specific geographical areas that are outside of the protective zones. Thus, terminals would be allowed to use the shared frequency range if their locations correspond to tiles that are outside of the protective zone. Within the protective zone, such terminals would only be allowed to communicate using non-shared frequency range belonging to the satellite communication system. The terminals would be prohibited from using the shared frequency range, which belongs to the terrestrial communication system. Furthermore, the service availability map can be compressed using ITU-T T.4 compression at the gateway.

At 616, the service availability map is broadcast within the service region. More particularly, the service availability map would be broadcast such that it is receivable by all terminals within the corresponding beam coverage area. Terminals in different service regions, or coverage beams, would receive a service availability map corresponding to their particular beam coverage area. According to one or more embodiments, however, the service availability map of adjacent coverage beams can also be broadcast to a selected service region (or beam coverage area) in order to prevent potential interference when restricted areas exist close to the boundary of adjacent coverage beams. This is illustrated at 618.

At 620, the terminal position is detected. This can correspond, for example, to the terminal utilizing internal GPS sensors to accurately detect its physical location, and correlate the position with the service availability map. According to one or more embodiments, the terminal can download data corresponding to the service availability map while in an idle mode. If the terminal remains within the beam coverage area, there is no need to re-acquire the service availability map because the restricted areas are likely in the form of fixed structures which cannot be easily moved to another location. Upon entering a new beam coverage area, however, the terminal would need to download the current service availability map for that beam coverage area. If the gateway identifies new restricted areas within the service region, the terminal would be required to download the new service availability map.

At 622, it is determined whether the terminal is physically located within the protective zone. According to at least one embodiment, the terminal can detect whether it's current GPS location falls within a protective zone. If the terminal is determined to be inside the protective zone, control passes to 624 where communication is established using a first frequency range (i.e., the non-shared frequency range). More particularly, if the terminal is currently in an idle mode, any communication session must be established using the first frequency range (i.e., the non-shared frequency range). Thus, the terminal would request bandwidth using channels specified by the satellite communication system. If the terminal is in a connected mode when entering the protective zone, any communication sessions that are not utilizing the first frequency range would be transferred to the first frequency range. The process would then and at 628.

If it is determined that the terminal is not inside the protective zone, control passes to 626. The terminal can then be authorized to establish communication sessions using either the first frequency range or a second frequency range (i.e., shared frequency range). Additionally, if the terminal is currently in a connected mode using the second frequency range, it is allowed to continue the communication session. Control then passes the 628. As can be appreciated, a terminal that is in motion must constantly be monitored to determine whether or not it has entered a protective zone. Accordingly, various steps (e.g., 620-626) of the foregoing process would be repeated in order to ensure that none of the protective zones are violated.

Figure 7:
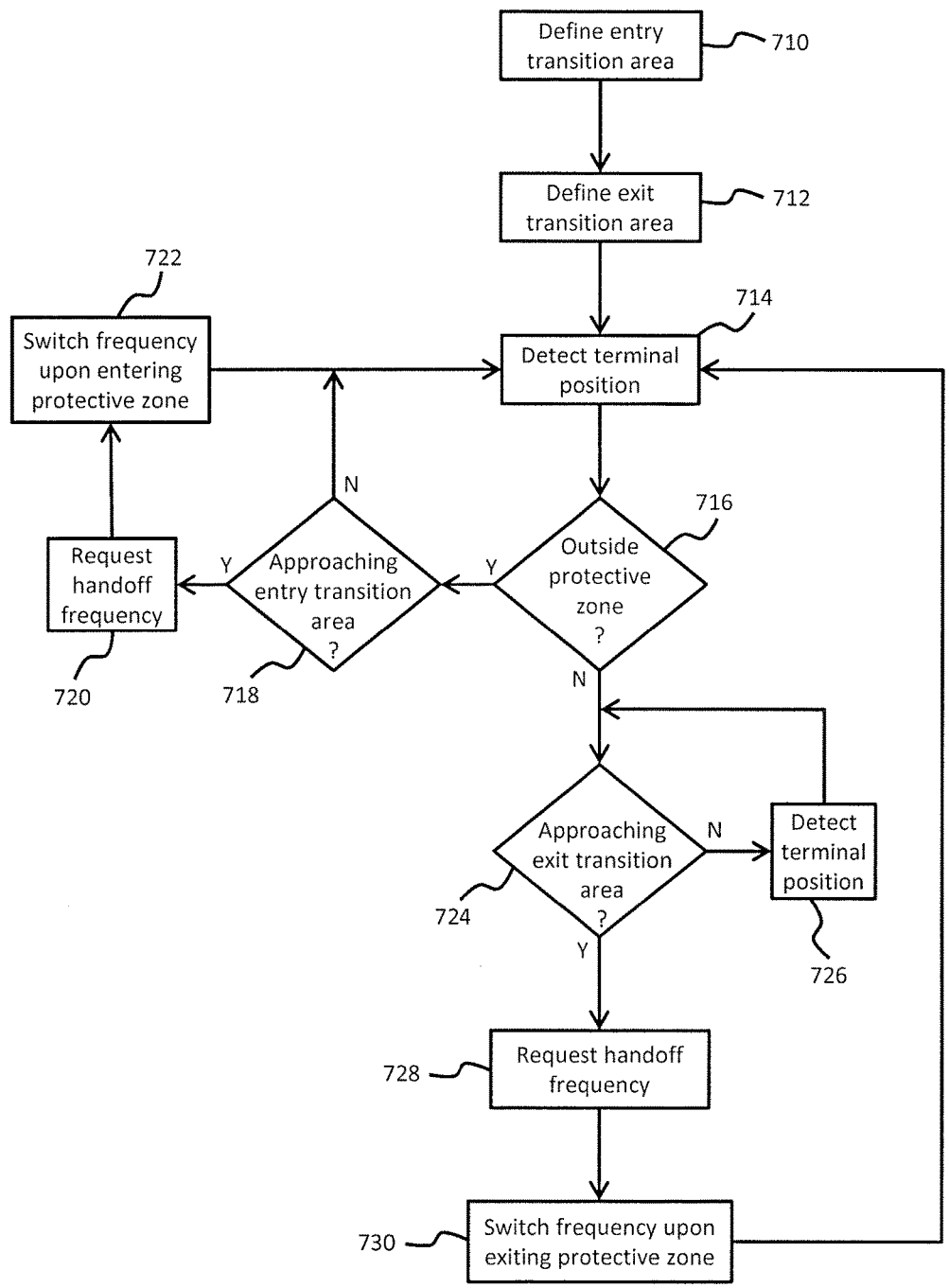
FIG. 7 is a flowchart illustrating steps performed to select appropriate communication frequencies, according to one or more embodiments.

FIG. 7 is a flowchart illustrating steps performed to select appropriate communication frequencies, according to various embodiments. At 710, an entry transition area is defined. The entry transition area can correspond, for example, to an area which surrounds the protective zone and provides a buffer between the protective zone and external areas. At 712, and exit transition area is defined. The exit transition area can correspond to an area that is adjacent to, and surrounded by, the protective zone. At 714, the terminal position is detected. According to at least one embodiment, the terminal can be configured to utilize information from collected from internal GPS sensors in order to identify its precise geographical position.

At 716, it is determined whether the detected position falls outside of the protective zone. If the terminal's position is determined to be outside of the protective zone, control passes to 718. It is further determined whether or not the terminal is approaching the entry transition area of a protective zone. More particularly, the terminal can utilize the GPS information to determine whether it is stationary or moving. If the terminal is moving, its direction can be determined from the GPS information in order to identify whether it is approaching the entry transition area. If the terminal is not approaching the entry transition area, control returns to 714. This can correspond to the condition where the terminal is moving, but not approaching the transition area. The terminal can also be stationary.

If it is determined that the terminal is approaching the entry transition area, control passes to 720. Upon crossing into the entry transition area, the terminal would request a handoff frequency in order to prevent any violation of the restricted area. According to various embodiments, a handoff frequency is only requested if the terminal is currently in a connected mode and utilizing the shared frequency range. Thus, if the terminal is not utilizing the shared frequency range, it would not be necessary to request a frequency handoff upon entering the protective zone. At 722, the terminal switches the communication session to the assigned frequency range upon entering the protective zone. Thus, the terminal utilizes the entry transition area to obtain all of the necessary information for transferring the communication session and applies such changes upon entering, or prior to entering, the protective zone in order to minimize any chance of violating the protective zone. Control then returns to 714 where the terminal's position is continually monitored.

If it is determined, at 716, that the terminal is not outside of the protective zone, control passes to 724. This corresponds to the situation where the terminal is currently located within the protective zone. At 724, it is determined whether or not the terminal is approaching an exit transition area for the protected zone. For example, if the terminal has been mobile and has entered a protective zone, its position is continually monitored in order to determine when it exits the protective zone. If it is determined that the terminal is not approaching the transition area, then control passes to 726 where the terminal's position continues to be detected (or monitored). Thus, if the terminal is stationary, or traveling in a route which keeps it within the protective zone, its position would continue to be monitored at 726.

If the terminal is approaching an exit transition area, however, a handoff frequency is requested at 728. Such a request would correspond to a change from the satellite frequency range to the shared frequency range, if the terminal is currently in the connected mode. If the terminal is not in the connected mode, the request for handoff frequency can simply correspond to a request for any specific channel allocation within the system for requesting bandwidth for subsequent communication sessions. At 730, the terminal switches from the non-shared frequency range to the shared frequency range in order to continue any active communication sessions upon exiting the protective zone. Current conditions within the terminal's primary communication system can also facilitate continuation of active communication sessions using the non-shared frequency range. Control then returns to 714 in order to monitor the terminal's position and prevent subsequent violation of any protective zones.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware can be incorporated into the previously described terminals, gateways, base stations, etc.

The terms software, computer software computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
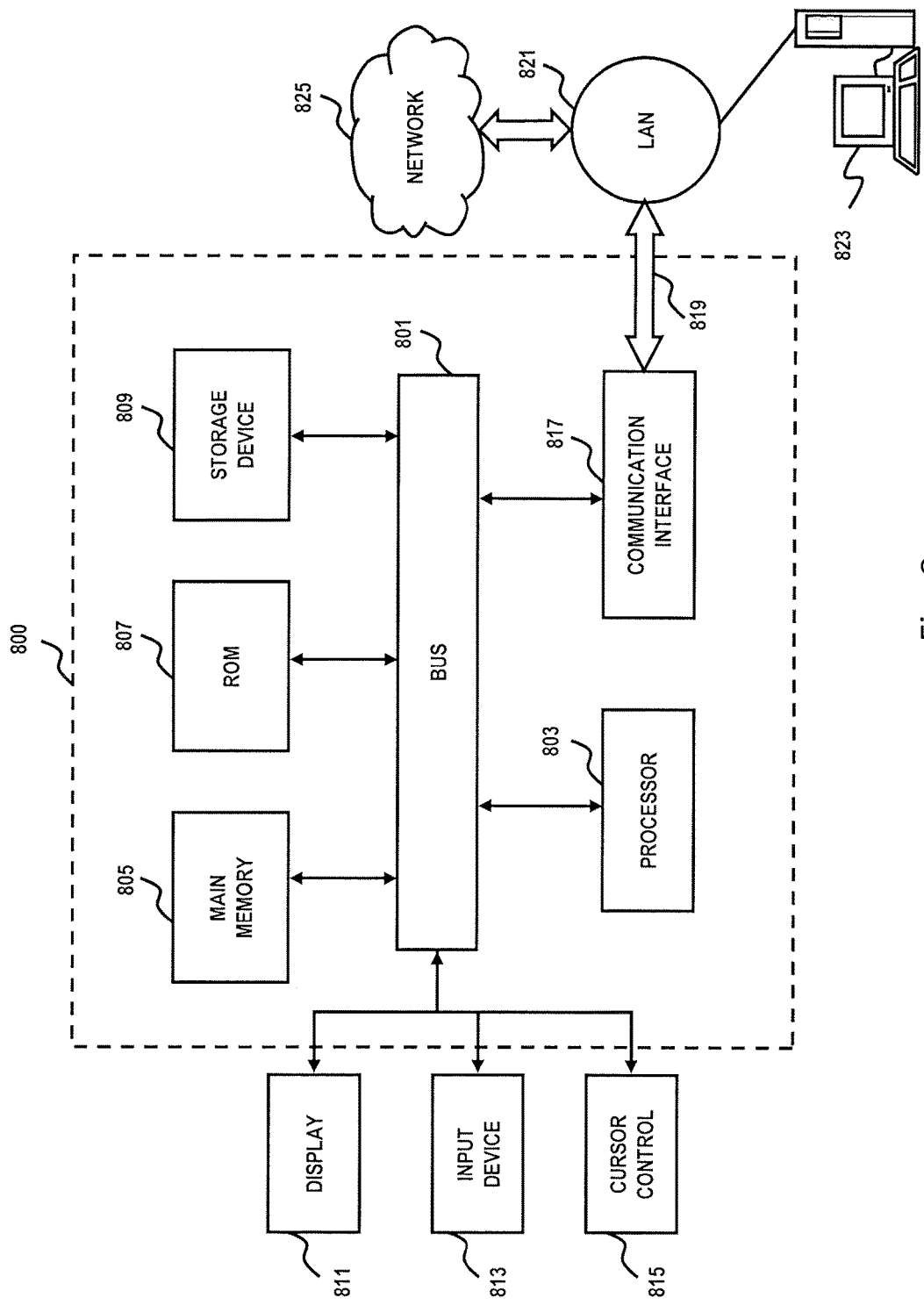
FIG. 8 is a diagram of a computer system that can be used to implement various exemplary embodiments.

FIG. 8 is a diagram of a computer system that can be used to implement various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
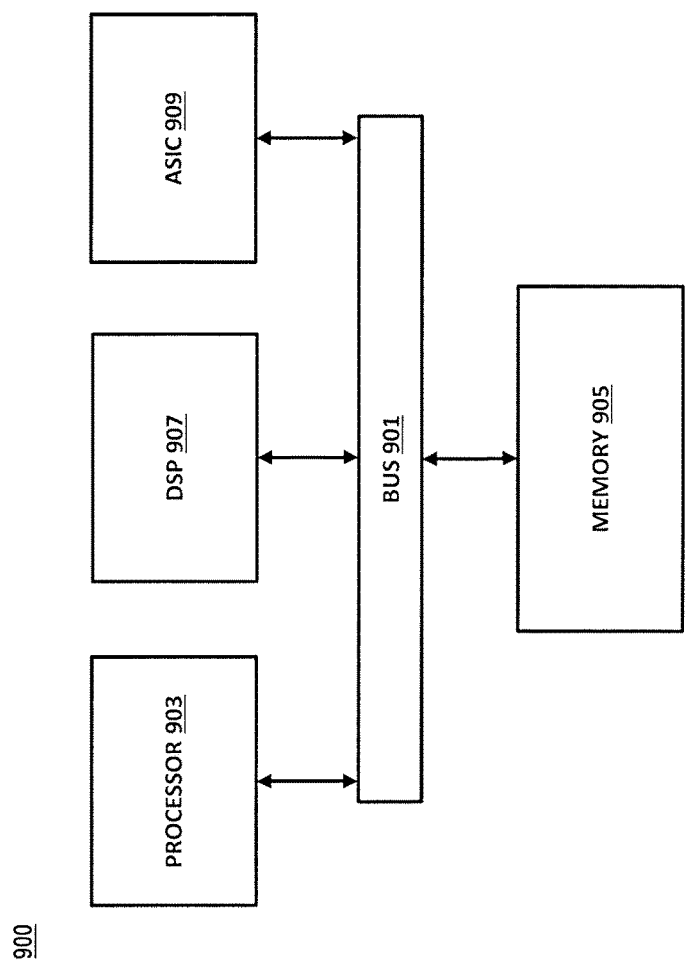
FIG. 9 a diagram of a chip set that can be used to implement various exemplary embodiments.

FIG. 9 illustrates a chip set 900 upon which an embodiment of the invention may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    identifying restricted areas within at least one service region of a first communication system;
    defining multiple sizes for protective zones surrounding each of the restricted areas, each terminal selecting a particular size of one of the protective zones based, at least in part, on its maximum transmit power;
    generating a service availability map having a plurality of tiles representative of the at least one service region, the service availability map including at least information corresponding to the protective zones;
    broadcasting the service availability map to terminals of the first communication system within the at least one service region;
    detecting a position of a selected terminal on the service availability map relative to the protective zones;
    establishing communication using a first frequency range in response to the selected terminal being inside one of the protective zones defined by the selected size; and
    establishing communication using either the first frequency range or a second frequency range in response to the selected terminal being outside of the protective zones,
    wherein the first frequency range belongs to the first communication system,
    wherein communication using the second frequency range is prohibited within the restricted areas, and
    wherein the second frequency range belongs to a second communication system and is shared with the first communication system.

2. The method of claim 1, further comprising broadcasting, to a selected service region, service availability maps of adjacent service regions.

3. The method of claim 1, wherein a size of the plurality of tiles is variably adjustable within at least one of the entire service region and predetermined portions of the entire service region.

4. The method of claim 1, wherein terminals of the first communication system download the service availability map while in an idle mode.

5. The method of claim 1, wherein the selected terminal is mobile and further comprising:
    continually monitoring the position of the selected terminal while in a connected mode; and
    switching between the first frequency range and the second frequency range based, at least in part, on the position of the selected terminal relative to the protective zones.

6. The method of claim 1, further comprising modifying a size of the protective zones, by the selected terminal, based on its maximum transmit power.

7. The method of claim 1, further comprising:
    defining an entry transition area surrounding each of the protective zones;
    detecting an approach of the selected terminal into the entry transition area while in a connected mode; and
    requesting handoff to the first frequency range, while in the entry transition area, if the selected terminal is currently using the second frequency range.

8. The method of claim 1, further comprising:
    defining an exit transition area surrounded by each of the protective zones;
    detecting an approach of the selected terminal into the exit transition area and while in a connected mode; and
    requesting handoff to the second frequency range while in the exit transition area.

9. The method of claim 1, wherein the selected terminal is outside of the protective zones and further comprising:
    establishing communication using either the first frequency range, the second frequency range, or a third frequency range,
    wherein the third frequency range belongs to a third communication system and is shared with the first communication system.

10. A system comprising:
    a plurality of terminals; and
    at least one gateway comprising a transceiver for transmitting and receiving information to and from the plurality of terminals, the at least one gateway being configured to:
    identify restricted areas within at least one service region of a first communication system,
    define multiple sizes for protective zones surrounding each of the restricted areas,
    generate a service availability map having a plurality of tiles representative of the at least one service region, the service availability map including at least information corresponding to the protective zones, and
    broadcast the service availability map to the plurality of terminals within the at least one service region,
    wherein each of the plurality of terminals is configured to:
    detect its position on the service availability map relative to the protective zones,
    select a particular size of one of the protective zones based, at least in part, on its maximum transmit power,
    establish communication using a first frequency range in response to the detected position being inside one of the protective zones defined the selected size, and
    establish communication using either the first frequency range or a second frequency range in response to the detected position being outside of the protective zones,
    wherein the first frequency range belongs to the first communication system,
    wherein communication using the second frequency range is prohibited within the restricted areas, and
    wherein the second frequency range belongs to a second communication system and is shared with the first communication system.

11. The system of claim 10, wherein the at least one gateway is further configured to broadcast, to a selected service region, service availability maps of adjacent service regions.

12. The system of claim 10, wherein the at least one gateway is further configured to variably adjust a size of the plurality of tiles within at least one of the entire service region and predetermined portions of the entire service region.

13. The system of claim 10, wherein the plurality of terminals are configured to download the service availability map while in an idle mode.

14. The system of claim 10, wherein terminals in a mobile state are further configured to:
    continually monitor their position while in a connected mode; and switch between the first frequency range and the second frequency range based, at least in part, on the monitored position relative to the protective zones.

15. The system of claim 10, wherein each of the plurality of terminals is further configured to modify a size of the protective zones, based on its maximum transmit power.

16. The system of claim 10, wherein:
the at least one gateway is further configured to define an entry transition area surrounding each of the protective zones; and
each of the plurality of terminals is further configured to:
detect an approach into the entry transition area while in a connected mode, and
request handoff to the first frequency range, while in the entry transition area, if the selected terminal is currently using the second frequency range.

17. The system of claim 10, wherein:
the at least one gateway is further configured to define an exit transition area surrounded by each of the protective zones; and
each of the plurality of terminals is further configured to:
detect an approach into the exit transition area while in a connected mode; and
request handoff to the second frequency range while in the exit transition area.

18. The system of claim 10, wherein:
each of the plurality of terminals is further configured to establish communication using either the first frequency range, the second frequency range, or a third frequency range; and
the third frequency range belongs to a third communication system and is shared with the first communication system.

19. A method comprising:
identifying restricted areas within at least one service region of a first communication system;
defining a protective zones surrounding each of the restricted areas;
generating a service availability map having a plurality of tiles representative of the at least one service region, the service availability map including at least information corresponding to the protective zones;
identifying tiles on the service availability map having service or no service using a pattern of ones and zeros;
broadcasting the service availability map to terminals of the first communication system within the at least one service region;
detecting a position of a selected terminal on the service availability map relative to the protective zones;
establishing communication using a first frequency range in response to the selected terminal is being inside one of the protective zones; and
establishing communication using either the first frequency range or a second frequency range in response to the selected terminal being outside of the protective zones,
wherein the first frequency range belongs to the first communication system,
wherein communication using the second frequency range is prohibited within the restricted areas, and
wherein the second frequency range belongs to a second communication system and is shared with the first communication system.

* * * * *